Figure 1:
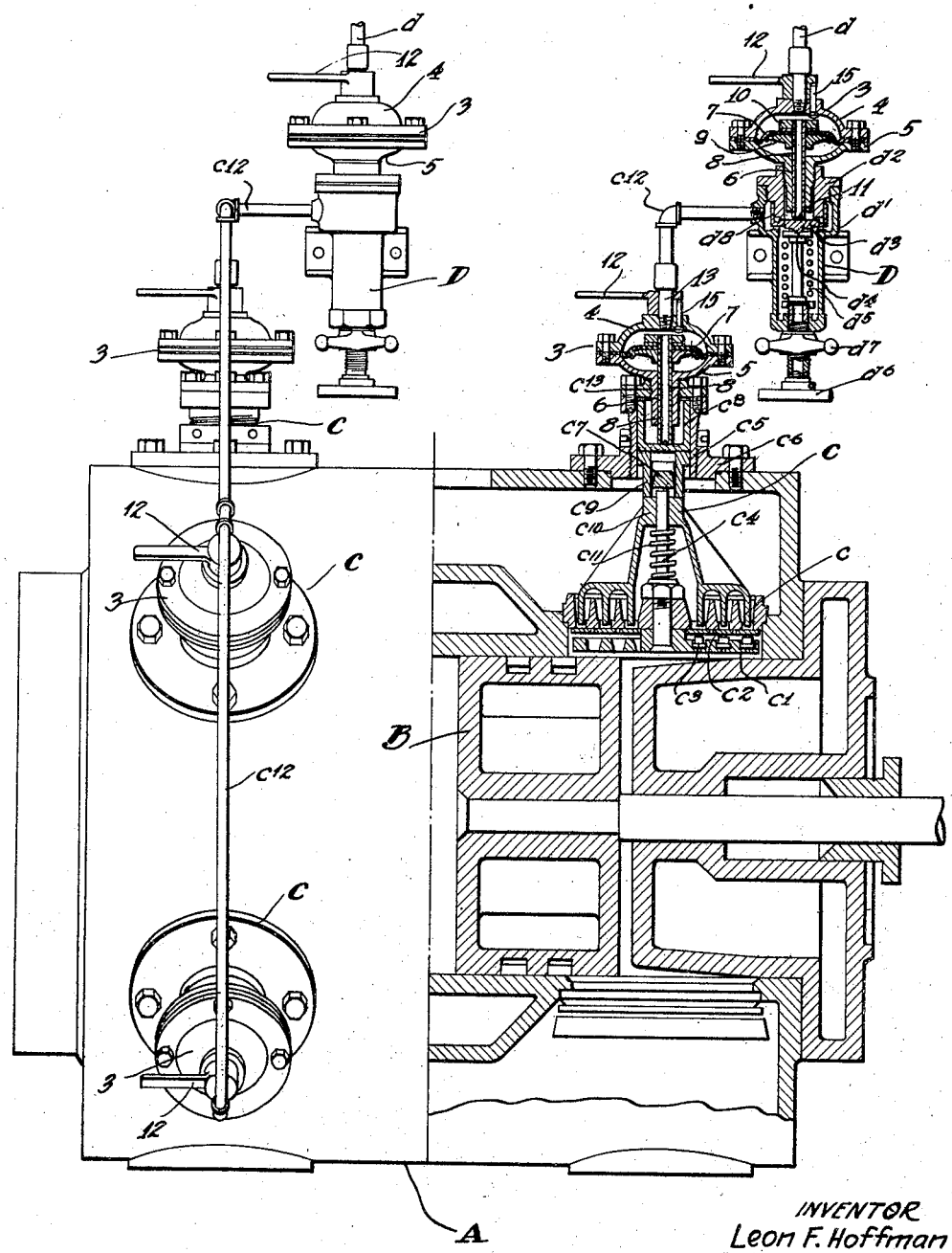

May 11, 1926.

L. F. HOFFMAN

AUTOMATIC LOW PRESSURE CONTROL APPARATUS FOR COMPRESSORS

Filed June 2, 1924

1,584,032

2 Sheets-Sheet 1

INVENTOR
Leon F. Hoffman
BY
Ira L. Nickerson
his ATTORNEY

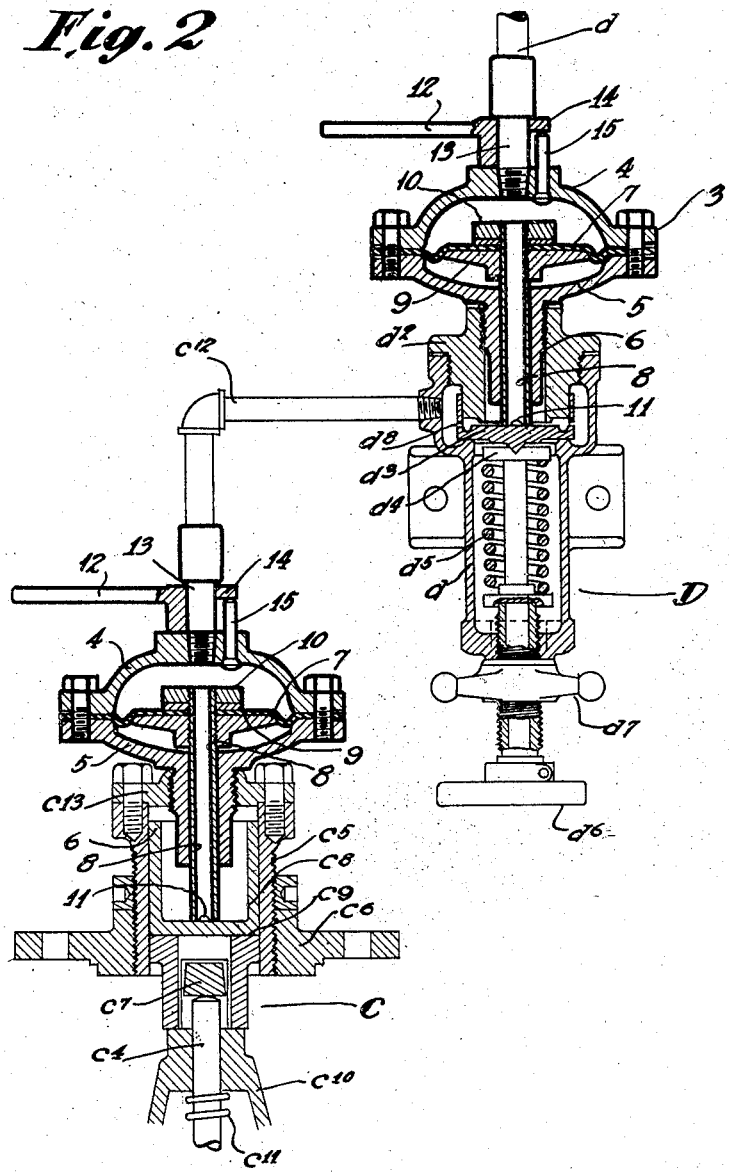

Patented May 11, 1926.

1,584,032

UNITED STATES PATENT OFFICE.

LEON F. HOFFMAN, OF FRANKLIN, PENNSYLVANIA, ASSIGNOR TO CHICAGO PNEUMATIC TOOL COMPANY, OF NEW YORK, N. Y., A CORPORATION OF NEW JERSEY.

AUTOMATIC LOW-PRESSURE CONTROL APPARATUS FOR COMPRESSORS.

Application filed June 2, 1924. Serial No. 717,228.

This invention relates to automatic control apparatus for fluid compressors, pumps, and the like and particularly to apparatus of this type which is responsive to low pressures, especially such extremely low pressures as below twelve pounds to the square inch.

The use of low fluid pressures, which was formerly restricted largely to the transmission of illuminating gas and in pneumatic tube systems, is steadily increasing with the industrial development and wide use of oil burners, of humidifying systems and with its adaptation to the agitation of liquids of all sorts in the many forms of wet processes and treatments both chemical and otherwise. The ordinary types of automatic control apparatus which function properly with high pressures are not suitable with low pressures since they frequently fail to operate at all on pressures below twelve pounds to the square inch and their operation at pressures slightly higher is inclined to be erratic.

Among the objects of the invention are to provide apparatus of the described type which operates efficiently and positively at any desired low pressure, to effect the above objects by the use of adapters readily applied to the ordinary forms of unloader and unloading valves, and in general to improve prior devices in the matter of effective range and sensitivity to widely varying pressures.

In order to make clear the nature of the invention one concrete embodiment thereof is shown in the accompanying drawings, in which:

Fig. 1 is a side elevational view partly in section of a compressor provided with control apparatus sensitive to low pressures; and Fig. 2 is an enlarged sectional view of an unloader and an unloading valve both equipped with the invention.

Fig. 1 illustrates a compressor and its controlling apparatus with the invention applied thereto, A being the compressor, B its piston, C fluid pressure operated unloading valves of any suitable or desired type, such as that disclosed in U. S. Patent No. 1,275,843 issued August 13, 1918 to W. H. Callan, and D unloader or pilot valves subjected to receiver pressure entering the same through pipes $d$ and adapted to control the operation of the unloading valve C. The unloader valves illustrated are of the differential type disclosed in U. S. Patent No. 1,224,272 issued May 1, 1917 to W. H. Callan et al. but they may be of any other suitable or desired type.

While the unloader and unloading valves form no part of the present invention, a brief description of the same may be of value in making clear the operation of the invention. Each of the unloading valve assemblies C comprises a valve seat $c$, a valve keeper $c'$ in spaced relation to the former with one or more plate valves $c^2$ disposed therebetween and urged toward the seat by springs $c^3$, a stem $c^4$ uniting seat and plate and holding the inner valve assembly in place in the compressor cylinder, for which purpose a sleeve or cylinder $c^5$ threaded into a cap plate $c^6$ has a cross piece $c^7$ engaging the end of stem $c^4$. A piston $c^8$ is slidable in cylinder $c^5$ and is adapted to act through a plunger $c^9$ upon a valve lifter $c^{10}$ slidably mounted on stem $c^4$ and normally held out of engagement with valves $c^2$ by a spring $c^{11}$. The motive fluid for acting upon piston $c^8$ is admitted through a pipe $c^{12}$ from the unloader valve assembly D which comprises a hollow casing $d'$ having a closure $d^2$ upon which is slidably mounted within the casing a valve $d^3$ adapted to cooperate either with a circular seat on casing $d'$ or with a seat on the end of closure $d^2$ to close the bore through the latter. The lower end of valve $d^3$ is engaged by plate $d^4$ backed by a spring $d^5$, the tension of which is controlled by adjusting screw $d^6$ provided with a lock nut $d^7$, the spring being adapted normally to hold the valve against the closure $d^2$. One or more small vents $d^8$ permit restricted passage of motive fluid into the chamber beyond the surrounding valve $d^3$ and thence into pipe $c^{12}$ when the valve is forced from its closure seat by motive fluid admitted from pipe $d$.

In order to adapt the control apparatus just described to the maintenance of any desired low pressure in the receiver, as a pressure of fifteen pounds to the square inch or under, it is necessary to increase the pressure areas of unloader and unloading valves of the type described. To this end adapters 3 comprising the present invention are arranged for convenient attachment to the unloader and unloading valves as shown. Each adapter consists of a casing formed of two dished members 4 and 5 arranged to be bolted or otherwise secured together. The lower member 5 has a stem 6, adapted to be threaded into or otherwise secured in the opening of the closure $d^2$ of unloading valve D or in the cap plate $c^{13}$ of the unloading valves C. The pipes $d$ and $c^{12}$ formerly connected directly to the unloader and unloading valves respectively are now connected to members 4 of the adapter. Within the adapter casing is a diaphragm 7 interposed between the pressure area of the valve and the source of motive fluid for actuating the same. Means are provided for transmitting to the pressure area of the valve, such as the valve member $d^3$ of unloader D or the piston $c^8$ of unloading valve C, not only a portion of the motive fluid which acts upon the diaphragm 7 but also the movement of the latter. The means may take the form of a tube 8 secured to the diaphragm 7 as by a plate 9 engaging the diaphragm on one side and a nut 10 engaging it on the other, whereby the diaphragm is clamped therebetween, the tube being arranged for sliding movement in the bore of stem 6 and of a length to rest upon or lightly engage the valve $d^3$ of the unloader D or the piston $c^8$ of unloading valve C, one or more openings or slots 11 permitting motive fluid to pass freely into the chambers adjacent the pressure areas of valves $d^3$ and piston $c^8$. Thus the adapter increases the pressure area of the member to be actuated to the extent of the effective pressure area of the diaphragm 7 and by making the diaphragm of proper size unloader and unloading valves can be made sensitive to very small changes in receiver pressure.

The operation of the apparatus is as follows: When the receiver pressure exceeds the amount predetermined by the adjustment of spring $d^5$ of unloader or pilot D, valve $d^3$ subjected to the pressure of the motive fluid (entering through pipe $d$) on its upper face or pressure area and upon the diaphragm 7 as transmitted through the stem 8, moves from its closed position (Fig. 1) to its open position (Fig. 2). Motive fluid then passes through the restricted ports $d^8$ into pipe $c^{12}$ and thence to the unloading valves C where it acts upon diaphragms 7 of their adapters and through tubes 8 upon pistons $c^8$ which on moving act upon plungers $c^9$ and valve lifters $c^{10}$ to force valves $c^2$ off their seats, thereby unloading the compressor. The compressor remains unloaded until falling pressure in the receiver permits spring $d^5$ to restore valve $d^3$ to its closed position (Fig. 1) whereupon the pressure fluid in the chambers of the unloading valves and in pipe $c^{12}$ escapes into the lower part of casing $d$ and thence by a suitable vent to atmosphere. This relief of pressure permits springs $c^{11}$ to restore lifters $c^{10}$ and their cooperating members to their normal inoperative position whereupon valves $c^2$ resume their normal function as compressor inlet valves.

In case it is desired to suspend the automatic operation of unloader and unloading valves equipped with adapters 3, manual means for actuating the same are provided. One arrangement for this purpose comprises a manual control 12 mounted for rotative movement on the stem or connection 13 secured to casing member 4 of the adapter and to which pipe $d$ or pipe $c^{12}$ is attached, control 12 having a cam surface 14 arranged to engage a pin plunger 15 to force the latter against nut 10 on tube 8 whereby the latter is utilized to actuate valve $d^3$ or piston $c^8$.

From the above it will be apparent that the present invention adapts automatic control apparatus for compressors to any desired pressure; that the adapter devices for this purpose are readily applied to existing types of unloader and unloading valves, that these devices do not interfere with the normal operation of such valves but merely serve to increase the effective pressure areas thereof, and that the adapters are relatively inexpensive to manufacture and when installed in automatic control systems by making slight changes in the pipe connections they operate in a positive manner to increase the low pressure range of such apparatus.

While but one form of the invention has been herein disclosed and described, it is to be understood that the invention is not limited to the specific details thereof but covers all changes, modifications and adaptations within the scope of the appended claims.

Having now described my invention and the manner of its use, what I claim and desire to secure by Letters Patent is:

1. The combination with a fluid compressor and automatic control apparatus therefor, of means inserted in the fluid pressure conduits to said control apparatus for adapting the same to pressures below the range of response of said apparatus.

2. The combination with a fluid compressor and automatic control apparatus therefor, of means readily applied to said control apparatus for adapting the same to pressure below the range of response of said apparatus and manual means operable through said first named means for suspending the automatic operation of said apparatus.

3. In combination, a compressor having unloader and unloading valves effecting automatic control thereof in response to receiver pressure, and means readily applied to said valves for increasing the effective areas thereof subjected to receiver pressure, thereby to render said valves responsive to low pressures.

4. In combination, a compressor, unloader and unloading valves therefor to effect automatic control of the compressor in response to receiver pressure, means inserted in the fluid pressure conduits to said valves for increasing the effective areas thereof subjected to receiver pressure, thereby to render said valves responsive to low pressures, and manual means operable through said first named means for suspending the automatic operation of said valves.

5. In combination, a compressor having unloader and unloading valves effecting automatic control of the compressor in response to receiver pressure, and means applied to at least one of said valves adapting the same to pressures below its normal range of response, said means increasing the pressure area of said valve responsive to receiver pressure.

6. In combination, a compressor, unloader and unloading valves therefor to effect automatic control of the compressor in response to receiver pressure, and means applied to at least one of said valves adapting the same to pressures below its normal range of response, said means increasing the pressure area of said valve responsive to receiver pressure and providing a manual control device for suspending the automatic operation of said valve.

7. In combination, a fluid compressor, unloader and unloading valves therefor to effect automatic control of the compressor in response to receiver pressure, and means applied to at least one of said valves to adapt the same to pressures below its normal range of response, said means comprising a diaphragm arranged to increase the pressure area of said valve responsive to receiver pressure.

8. In combination, a fluid compressor, unloader and unloading valves therefor to effect automatic control of the compressor in response to receiver pressure, and means applied to at least one of said valves to adapt the same to pressures below its normal range of response, said means comprising a diaphragm interposed between the pressure area of said valve and the pressure receiver, and a duct for conducting the receiver pressure to said area, said diaphragm being arranged to increase the pressure area of said valve.

9. In combination, a fluid compressor, unloader and unloading valves therefor to effect automatic control of the compressor in response to receiver pressure, and means applied to at least one of said valves to adapt the same to pressures below its normal range of response, said means comprising a casing inclosing a diaphragm interposed between the pressure area of said valve and receiver pressure, and a hollow member interposed between said area and said diaphragm for conducting pressure fluid to the former and for imparting the movement of the diaphragm to said area.

10. In combination, a fluid compressor, unloader and unloading valves therefor to effect automatic control of the compressor in response to receiver pressure, and means applied to at least one of said valves to adapt the same to pressures below its normal range of response, said means comprising a casing inclosing a diaphragm interposed between the pressure area of said valve and receiver pressure, and a tube slidably mounted in said casing and movable with said diaphragm for transmitting both pressure fluid and the movement of said diaphragm to said area.

11. In combination, a fluid compressor, unloader and unloading valves therefor to effect automatic control of the compressor in response to receiver pressure, and means applied to at least one of said valves to adapt the same to pressures below its normal range of response, said means comprising a casing inclosing a diaphragm interposed between the pressure area of said valve and receiver pressure, a hollow member interposed between said area and said diaphragm for conducting pressure fluid to the former and for imparting the movement of the diaphragm to said area, and manual means operable through said member for actuating said valve.

12. In combination, a fluid compressor, unloader and unloading valves therefor to effect automatic control of the compressor in response to receiver pressure, and means applied to at least one of said valves to adapt the same to pressures below its normal range of response, said means comprising a casing inclosing a diaphragm interposed between the pressure area of said valve and receiver pressure, a tube slidably mounted in said casing and movable with said diaphragm for transmitting both pressure fluid and the movement of said diaphragm to said area, and manual means operable through said tube for actuating said valve.

13. In combination, a fluid compressor, valves for effecting automatic control of the compressor in response to receiver pressure, and means applied to at least one of said valves to adapt the same to pressures below their normal range of response, said means comprising a casing secured in the pressure fluid supply to the valve, means within said casing movable in response to fluid pressure in said supply but permitting passage of pressure fluid to the valve, and means imparting the movement of said first named means to said valve.

14. In combination, a fluid compressor, valves for effecting automatic control of the compressor in response to receiver pressure, and means applied to each of said valves to adapt the same to pressures below their normal range of response, said means comprising a casing secured in the pressure fluid inlet of the valve, a fluid conducting member movably mounted in said casing and arranged to operate said valve, and means responsive to fluid pressure for moving said member whereby operation of said valve is effected both by pressure fluid admitted to said valve by said member and by the movement of the latter.

15. In combination, a fluid compressor, valves for effecting automatic control of the compressor in response to receiver pressure, and means applied to at least one of said valves to adapt the same to pressures below their normal range of response, said means comprising a casing secured in the pressure fluid inlet of the valve, a fluid conducting member movably mounted in said casing and arranged to operate said valve, and a diaphragm in said casing secured to said member for moving the latter, whereby operation of said valve is effected both by pressure fluid admitted to said valve by said member and by the movement of the latter.

16. In combination, a fluid compressor, valves for effecting automatic control of the compressor in response to receiver pressure, and means applied to each of said valves to adapt the same to pressures below their normal range of response, said means comprising a casing secured in the pressure fluid inlet of the valve, a tube slidably mounted in said casing, a plate fixed upon said tube, a clamping nut upon said tube beyond said plate, a diaphragm in said casing clamped to said plate by said nut to effect movement of said tube, the valve being operated by fluid pressure admitted thereto by said tube and by the movement of the latter, a plunger extending through said casing to engage said nut, and manually operable means for forcing said plunger against said nut thereby to operate said valve.

17. An adapter for the unloader and unloading valves of air and gas compressors comprising a casing constructed and arranged to be secured in the pressure fluid inlet of the valve, and means therewithin cooperating with the valve for adapting the same to pressures below the range of its normal response.

18. An adapter for the unloader and unloading valves of air and gas compressors comprising a casing constructed and arranged to be secured in the pressure fluid supply to the valve, and means within said casing for increasing the effective area of the valve subjected to fluid pressure thereby to render the valve responsive to low pressures.

19. An adapter for the unloader and unloading valves of air and gas compressors comprising a casing constructed and arranged to be secured to the valve, and means for increasing the effective area of the valve subjected to fluid pressure comprising a diaphragm within said casing to be interposed between the pressure area of the valve and the source of fluid pressure.

20. An adapter for the unloader and unloading valves of air and gas compressors comprising a casing constructed and arranged to be secured to the valve, a diaphragm within said casing to be interposed between the pressure area of the valve and the source of fluid pressure, and a hollow member interposed between the said area of the valve and said diaphragm for conducting pressure fluid to the former and for transmitting the movement of said diaphragm to said area.

21. An adapter for the unloader and unloading valves of air and gas compressors comprising a casing constructed and arranged to be secured to the valve, a diaphragm within said casing to be interposed between the pressure area of the valve and the source of fluid pressure, and a tube slidably mounted in said casing and movable with said diaphragm for transmitting both pressure fluid and diaphragm movement to said area.

22. An adapter for unloader and unloading valves comprising a casing constructed and arranged to be secured to the valve, a diaphragm within said casing to be interposed between the pressure area of the valve and the source of fluid pressure, a hollow member interposed between the said area of the valve and said diaphragm for conducting pressure fluid to the former and for transmitting the movement of said diaphragm to said area, and manual means operable through said member for actuating the valve.

23. An adapter for unloader and unloading valves comprising a casing constructed and arranged to be secured to the valve, a diaphragm within said casing to be interposed between the pressure area of the valve and the source of the fluid pressure, a tube slidably mounted in said casing and movable with said diaphragm for transmitting both pressure fluid and diaphragm movement to said area, and manual means operable through said member for actuating the valve.

24. An adapter for the automatic control valves of air and gas compressors comprising a casing constructed and arranged to be secured to the pressure fluid inlet of the valve, a fluid conducting member movably mounted in said casing and arranged to operate the valve, and means within said casing responsive to fluid pressure for moving said valve while permitting the passage of pressure fluid therethrough.

25. An adapter for the automatic control valves of air and gas compressors comprising a casing constructed and arranged to be disposed in the pressure fluid supply to the valve, means within said casing movable in response to fluid pressure in said supply but permitting passage of pressure fluid to the valve, and means imparting the movement of said first named means to said valve.

Signed by me at Franklin, Pennsylvania, this 23d day of May 1924.

LEON F. HOFFMAN.